United States Patent
Ota et al.

(10) Patent No.: US 7,459,119 B2
(45) Date of Patent: Dec. 2, 2008

(54) LAMINATED POLYESTER RESIN CONTAINER AND METHOD OF MOLDING SUCH A CONTAINER

(75) Inventors: Akiho Ota, Isehara (JP); Daisuke Uesugi, Matsudo (JP); Masato Suzuki, Isehara (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 1289 days.

(21) Appl. No.: 10/463,545

(22) Filed: Jun. 18, 2003

(65) Prior Publication Data
US 2004/0065984 A1 Apr. 8, 2004

Related U.S. Application Data

(63) Continuation of application No. 09/869,694, filed as application No. PCT/JP00/08388 on Nov. 29, 2000, now abandoned.

(30) Foreign Application Priority Data

Nov. 30, 1999 (JP) .................................. 11-341468
Nov. 28, 2000 (JP) ............................. 2000-361320

(51) Int. Cl.
*B29C 49/22* (2006.01)
(52) U.S. Cl. ..................... 264/513; 264/521; 264/906; 428/35.7; 428/35.4; 428/34.1
(58) Field of Classification Search ................ 264/513, 264/521, 906; 428/35.7, 35.4, 34.1
See application file for complete search history.

(56) References Cited

U.S. PATENT DOCUMENTS 4,379,099 A 4/1983 Ota et al.
4,710,118 A * 12/1987 Krishnakumar et al. ..... 425/130
5,248,533 A 9/1993 Sugiura et al.
5,785,921 A * 7/1998 Outreman et al. ........... 264/529
5,928,742 A * 7/1999 Sugiura et al. ............. 428/35.7
6,112,925 A 9/2000 Nahill et al.

(Continued)

FOREIGN PATENT DOCUMENTS

JP A 61-268426 11/1986

(Continued)

*Primary Examiner*—Suzanne E. McDowell
(74) *Attorney, Agent, or Firm*—Oliff & Berridge, PLC

(57) ABSTRACT

A multiplayer perform having at least a medium or intermediate gas barrier layer is prepared in advance by the injection molding of this perform in a predetermined shape that corresponds to the shape of a finished molded product. The body portion of this perform is heated to a blow moldable temperature. The heated perform is set in a primary blow mold (12), and is blow molded in the biaxial orientation to give a primary molded intermediate (5). The primary intermediate (5) is then heated to deform it forcibly by thermal shrinkage and thereby to give the secondary molded intermediate (6). The shrunken secondary intermediate (6) is set in a secondary blow mold (13), and is subjected to the secondary blow molding in the biaxial orientation to obtain a finished molded product, which is fixed thermally to give heat history to the PET resin. As a result, the PET resin layers are given a high degree of crystallization, which serves to complement the function of the gas barrier layer or layers in such a way that the container has high and effective gas barrier properties.

6 Claims, 5 Drawing Sheets

U.S. PATENT DOCUMENTS 6,365,247 B1  4/2002  Cahill et al.
6,391,408 B1  5/2002  Hutchinson

FOREIGN PATENT DOCUMENTS

| JP | A 1-153453 | 6/1989 |
| JP | A 5-31792 | 2/1993 |
| JP | A 5-200839 | 8/1993 |

* cited by examiner

FIG. 2
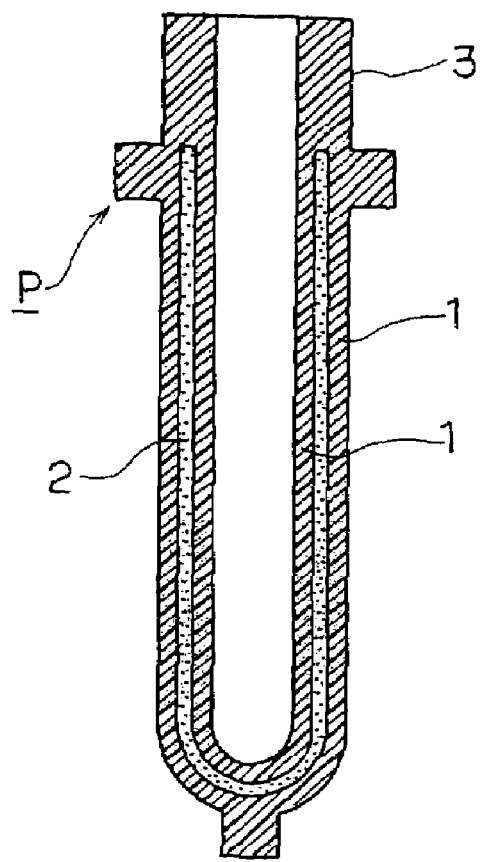
a.
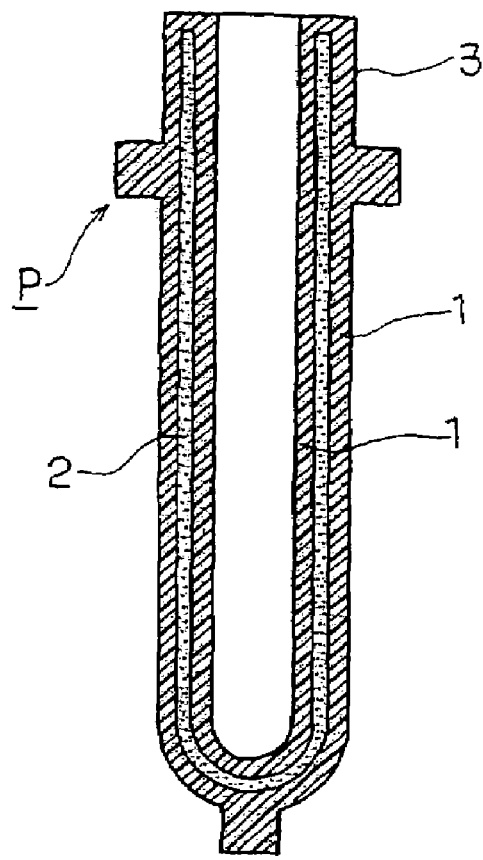
b.

F I G. 4
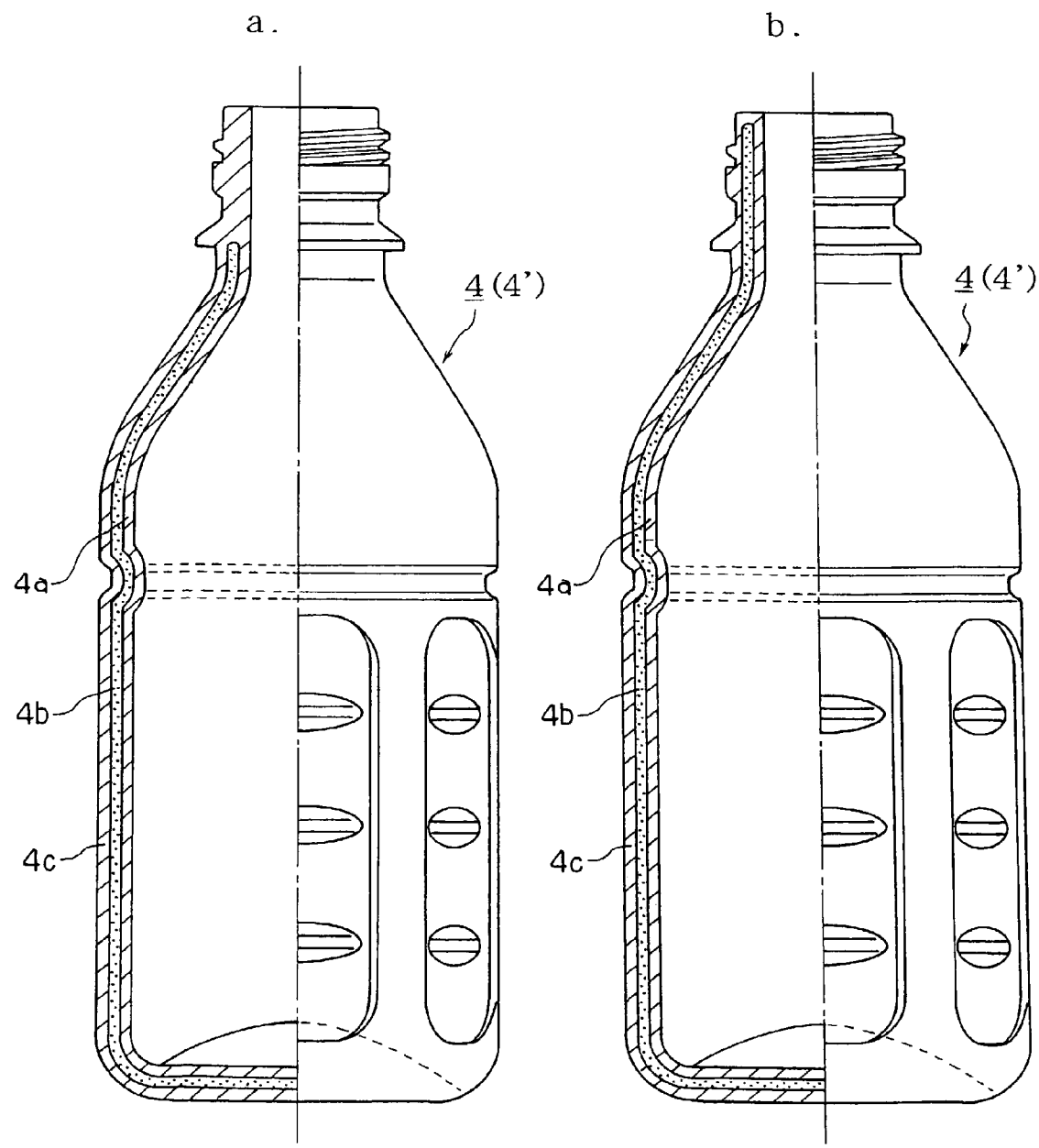

FIG. 5
a.
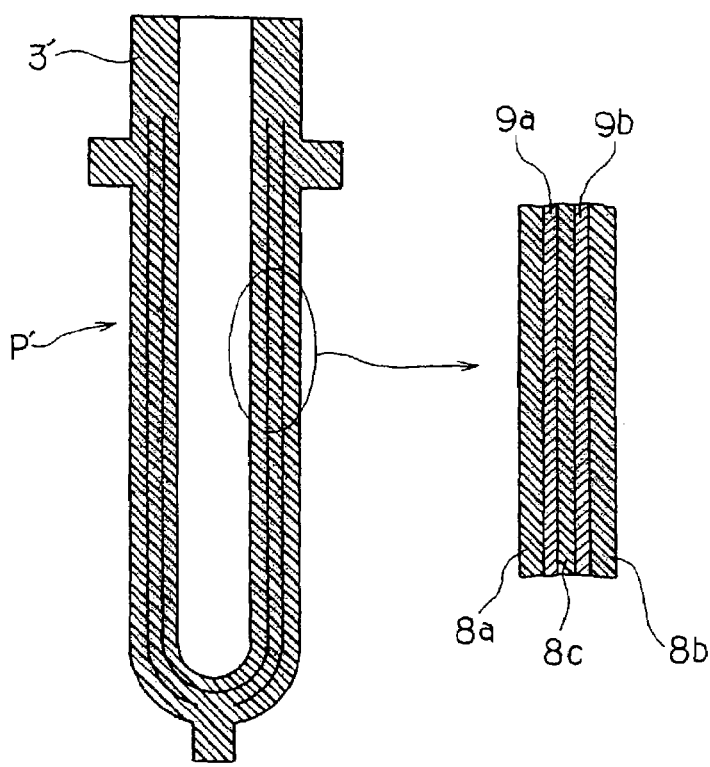
b.
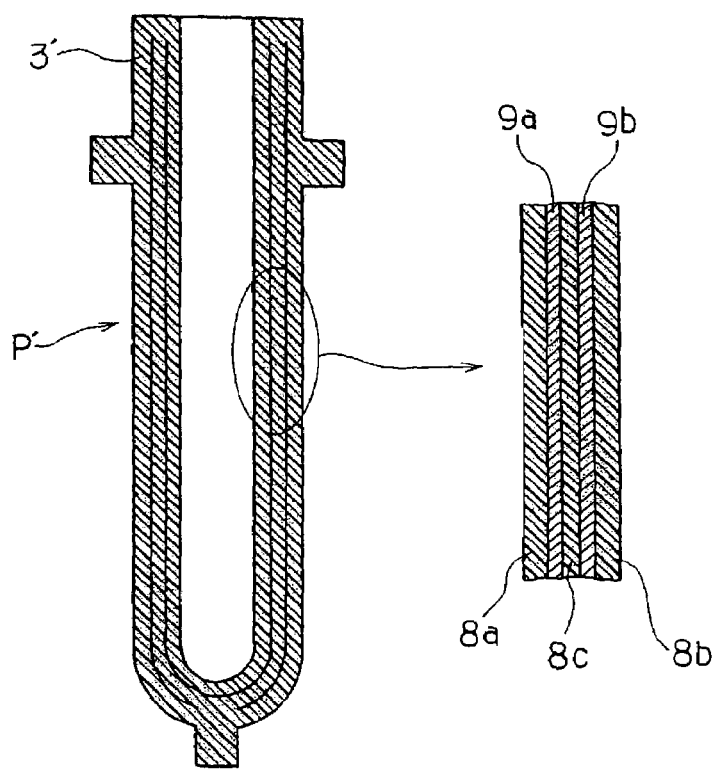

US 7,459,119 B2

LAMINATED POLYESTER RESIN CONTAINER AND METHOD OF MOLDING SUCH A CONTAINER

This is a divisional application of prior application Ser. No. 09/869,694, filed Jul. 3, 2001 now abandoned, which is a U.S. National Stage of PCT/JP00/08388, filed Nov. 29, 2000.

BACKGROUND OF THE INVENTION

1. Field of Invention

This invention relates to a laminated polyester resin container and the method of molding such a container. More particularly, this invention relates to a laminated, biaxially oriented container of a thermoplastic polyester, including polyethylene terephthalate as the major component, which is laminated with a thin, clear film layer having high gas barrier properties; and to the method of molding such a container.

2. Description of Related Art

The polyethylene terephthalate resin (hereinafter referred to as PET resin) is a representative thermoplastic polyester resin known to have stable physical properties, antipollution property, an outstanding degree of transparency, and a high mechanical strength. Because of these favorable properties, the PET is used in large amounts in various fields of application as the biaxially oriented, blow-molded bottles and hollow containers in other shapes.

Especially because these PET containers contain no additive such as plasticizer or stabilizer and are hygienic and harmless to the human body, they attract attention, and are in wide use, as quite useful containers for medical use and for foods and drinks.

Although PET resin containers have so many quite excellent properties, even PET resin containers fall short of the gas barrier property against oxygen in the air, especially in cases where the foods, with which bottles are filled, require a high air-blocking property. Because of such low gas barrier properties, the food may lose its taste or food spoilage may result. Thus, an unsatisfactory point still remains.

One of the methods of solving these various problems is to mold a multilayer preform by laminating a layer of a different type of resin having a high air-blocking property on the outer surface of the polyethylene terephthalate resin layer and then blow molding this preform in the biaxial orientation to obtain a multilayer container.

However, the hollow containers thus obtained were not acceptable as commercial products because the crystallizing and/or clouding phenomenon occurs between the inner and outer layers when the preform is obtained by laminating different resins, one by one, by the conventional injection molding method. As a result, the blow moldability of the preform gets worse and its adhesive property decreases at the interface between resin layers.

Official gazettes of Japanese patent applications laid open No. 1982-128516 and No. 1990-258310 proposed the well-known improvements in the preparation of multilayer preforms that are obtained by almost simultaneous lamination of a PET resin with another resin. These methods involved injecting the polyethylene terephthalate resin into the mold and immediately thereafter co-injecting into the same mold one of various nylons (e.g., an MXD-6 nylon resin), which are polyamide resins containing meta-xylyl radicals and having high gas barrier properties, to mold the preform of a 3-layer structure comprising the inner and outer layers of the polyethylene terephthalate resin and the middle layer of a nylon resin. The 3-layer preform is then blow molded into a multilayer container.

Although MXD-6 nylon and ethylene vinyl alcohol copolymer resins have high gas barrier properties, they have also unfavorable mechanical properties and low degrees of transparency. It is desirable to make the gas barrier layer as thin as possible and to secure the transparency of laminates as much as possible. When the multilayer preform were blow molded under these limited conditions, the hollow container thus obtained would often have insufficient gas barrier properties, as evidenced by the breaking in the resin layers that have high gas barrier properties but poor mechanical strength.

Meanwhile, a thin gas barrier resin layer in the above-described 3-layer structure was found difficult to obtain. It was also pointed out that the containers obtained from the above-described 3-layer preforms were disadvantageous because, when gases pass through a thermoplastic polyester resin layer and is blocked by the gas barrier layer, the gases accumulate between these layers over time, thus causing the cleavage of layers. Official gazettes of Japanese patent application laid open No. 1985-240409 and patent publication No. 1993-79494 proposed to inject the PET resin, an MX nylon resin, and the PET resin in this order into the same mold to mold a 5-layer preform comprising the inner and outer layers of polyethylene terephthalate as well as the center core of PET, plus two thin intermediate layers of the MXD nylon resin in an alternately laminated structure.

Following is a quotation from these inventions: "This injection molding can be conducted by using an injection-molding machine provided with two injection cylinders, i.e., one for injecting a thermoplastic polyester resin (resin A) and the other for injecting a polyamide resin (resin B) containing meta-xylyl radicals. Molten resins A and B are injected, one by one, into the same mold in the order of resin A, resin B, and resin A under the conditions that satisfy the equations (1) to (4) described below. The trunk portion of the preform (corresponding to the bottle trunk after blow molding) has a 5-layer structure which comprises the inner and outer layers of resin A as well as the center core of resin A, plus two intermediate layers of resin B that sandwich the center core, with at least the open mouth portion having a single-layer structure. A multilayer container can be obtained by blow molding such a preform in the biaxial orientation.

$$V1 \geq V2 \tag{1}$$

$$8 \text{ cc/sec} \leq V2 \leq 35 \text{ cc/sec} \tag{2}$$

$$0.7 \leq A1/A2 \leq 1.6 \tag{3}$$

$$B1/(A1+A2+B1) \leq 0.25 \tag{4}$$

"Wherein V1 is the injection speed for the initially injected resin A; V2 is the injection speed for the lastly injected resin A; A1 is the injection shot volume for the initially injected resin A; A2 is the injection shot volume for the lastly injected resin A; and B1 is the injection shot volume for the resin B. Cleavage can be prevented by providing two gas barrier resin layers and dispersing gasses that accumulate between layers."

The above-described 3-layer and 5-layer preforms are preheated to a blow moldable temperature, and then are expanded in a blow mold and blown in the biaxial orientation to obtain multilayer containers. However, even the containers of the 5-layer structure cannot be prevented from the breaking of the gas barrier layer observed in the above 3-layer structure. Under these circumstances, the above-described multilayer containers are not totally reliable and are not yet in the actual use.

This invention has been made to solve these problems. An object of this invention is to provide a laminated, biaxially oriented container of the multilayer structure comprising thermoplastic polyester resin layers and a thin, clear intermediate layer or layers having gas barrier properties, wherein insufficient reliability of the thin, clear gas barrier layer or layers are complemented by the impartment of gas barrier properties to the container wall so that the gas barrier properties of the container can be secured. Another object of this invention is to provide a method of molding such a laminated polyester resin container.

SUMMARY OF THE INVENTION

The object of this invention to provide a multilayer container is achieved by a hollow, laminated, and blow-molded container made of a polyester resin, which comprises the mouth/neck portion of a single-layer polyester resin and the thin trunk and bottom portions in a multilayer structure of 3 layers or more, including the layers of at least two thermoplastic synthetic resins, such as a polyester resin and a gas barrier resin, wherein the mouth/neck portion has been treated for whitening, and wherein the thin trunk and bottom portions, except for the mouth/neck portion, are composed of an outermost and an innermost layers of the polyester resin and at least a thin, clear medium or intermediate layer of the gas barrier resin.

Another container of this invention is a hollow, laminated, and blow-molded container made of a polyester resin, which comprises the mouth/neck portion and the thin trunk and bottom portions in a multilayer structure of 3 layers or more, including the layers of at least two thermoplastic synthetic resins, such as a polyester resin and a gas barrier resin, wherein the mouth/neck portion has been treated for whitening, wherein the gas barrier resin layer extends upward and comes close to the top of the mouth/neck portion, and wherein the thin trunk portion, including the bottom and mouth/neck portions, comprises an outermost and an innermost layers of the polyester resin and at least a medium or intermediate layer of the gas barrier resin.

The method of this invention for molding a laminated polyester resin container comprises the steps of:

(a) Preparing in advance a multilayer preform by injection-molding the preform in a predetermined shape that corresponds to the shape of a finished molded product, wherein the mouth/neck portion consists of a single layer of the polyester resin and wherein the body portion, including trunk and bottom but excluding the mouth/neck portion, comprises an outer and an inner layers of the polyester resin and at least a medium or intermediate layer of a gas barrier resin;

(b) Treating only the mouth/neck portion of the preform for whitening and heating the body portion of the preform to a blow moldable temperature;

(c) Setting the heated preform in a primary blow mold and blow molding the preform in the biaxial orientation to give a primary molded intermediate;

(d) Taking the primary intermediate out of the primary blow mold and heating the intermediate to deform it forcibly by thermal shrinkage and thereby to give the secondary molded intermediate; and, (e) Setting the shrunken secondary intermediate in a secondary blow mold, and subjecting the intermediate to the secondary blow molding in the biaxial orientation to obtain a finished molded product.

The method of this invention for molding another laminated polyester resin container comprises the steps of:

(a) Preparing in advance a multilayer preform by injection-molding the preform in a predetermined shape that corresponds to the shape of a finished molded product, wherein the body portion, including the mouth/neck portion and the trunk and bottom portions, comprises an outer and an inner layers of the polyester resin and at least a medium or intermediate layer of a gas barrier resin;

(b) Treating only the mouth/neck portion of the preform for whitening and then heating the body portion of the preform to a blow moldable temperature;

(c) Setting the heated preform in a primary blow mold and blow molding preform in the biaxial orientation to give a primary molded intermediate;

(d) Taking the primary intermediate out of the primary blow mold and heating the intermediate to deform it forcibly by thermal shrinkage and thereby to give the secondary molded intermediate; and, (e) Setting the shrunken secondary intermediate in a secondary blow mold, and subjecting the intermediate to the secondary blow molding in the biaxial orientation to obtain a finished molded product.

Laminated containers comprise a gas barrier resin layer or layers having low mechanical properties, and the gas barrier layer or layers have to be as thin as possible to make sure that these intermediate layers are transparent in the multilayer preforms. However, when these preforms are subjected to double or two-step blow molding, the PET resin acquires a high degree of crystallization, and higher gas barrier properties are imparted to the containers than in the single blow molded containers.

Since these double blow molded containers are thermally treated along the way to the double blow molding in the biaxial orientation, the containers are also given the resistance to heat.

BRIEF DESCRIPTION OF THE DRAWINGS

FIGS. 2a and 2b are vertical cross-sectional views of the 3-layer preforms used in this invention.

FIGS. 4a and 4b are partially cross-sectional views showing the hollow, laminated containers molded by the method of this invention.

FIGS. 5a and 5b are vertical cross-sectional views showing the 5-layer preforms used in this invention.

DETAILED DESCRIPTION OF PREFERRED EMBODIMENTS

Figure 1:
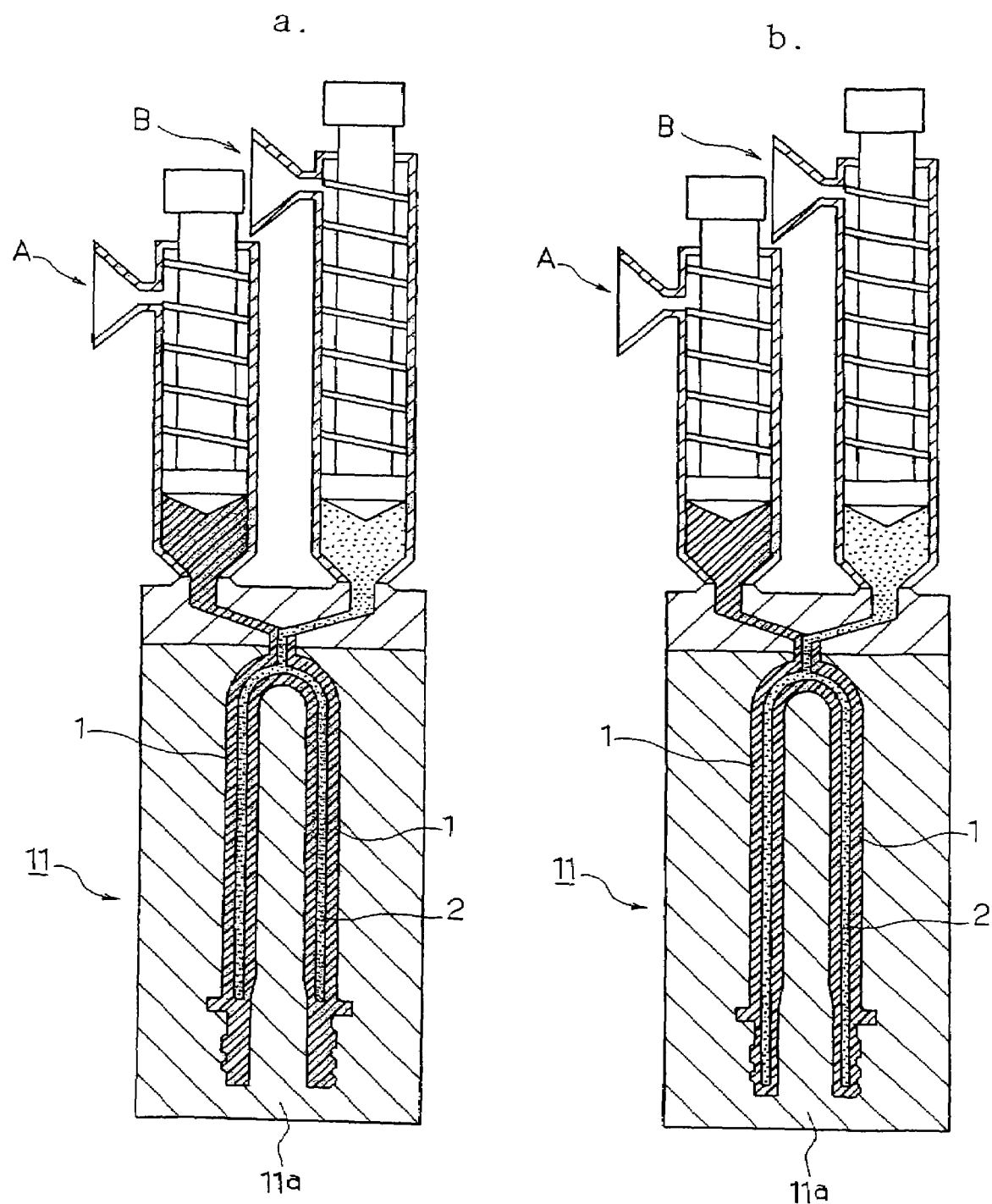
FIGS. 1a and 1b are vertical cross-sectional views showing the injection molding of multilayer preforms.

An example of the biaxially oriented blow molding method for molding the multilayer container of this invention is described, as an example of the completed invention, by referring to the drawings.

EXAMPLE 1

When the biaxially oriented blow molding method of this invention was used to mold a multilayer container, the first injection-molding machine A was fed with the PET resin to form the innermost layer and the outer layer, and the second injection-molding machine B was fed with the MXD-6 nylon resin to form the middle gas barrier layer, as shown in FIGS. 1a and 1b. After each resin was molten and kneaded, the molten PET resin was injected from the first injection-molding machine A into the injection mold 11. Then, with a slight time lag, the MXD-6 nylon resin was injected only in a given amount from the second injection-molding machine B. When the injection of MXD-6 nylon resin from the second machine B was stopped halfway, the preform P thus formed was composed of the inner and outer layers 1, 1 of PET resin, plus a middle layer 2 of MXD-6 nylon. The preform P of a 3-layer structure had a predetermined shape that corresponded to the shape of the finished molded product, as shown in FIGS. 2a and 2b.

FIGS. 1b and 2b show a preform in which the middle layer 2 extends close to the top of the mouth/neck portion so that this portion, too, is given the gas barrier properties.

The laminated preform P thus obtained was then subjected to whitening treatment. In this step, only the mouth/neck portion of the preform, which was to become the mouth/neck portion of the finished molded product, such as a bottle, was preferably heated to a crystallizing temperature so as to crystallize only the mouth/neck portion without causing any thermal deformation.

After the mouth/neck portion was treated for whitening, the preform P was heated to a blow moldable temperature in the range of 90-120 deg C., which was close to the thermal crystallization temperature. The preform P was then placed in the primary blow mold 12, 12, which had been preheated to 70-180 deg C., as shown in FIG. 3(a), and the primary blow molding was performed in the biaxial orientation to obtain the primary molded intermediate 5.

After the above primary blow mold was opened, the primary intermediate 5 was taken out of the primary blow mold and was heated in the heating zone H provided with a heater, such as one utilizing far infrared rays, at a temperature in the range of 130-200 deg C., which was higher than the temperature used in the primary blow mold, as shown in FIG. 3(b). In this heating step, the primary intermediate was forcibly deformed by thermal shrinkage, and the secondary molded intermediate 6 was obtained.

The above secondary intermediate 6 was set in the secondary blow mold 13, 13 that had been heated to a temperature in the range of 80-150 deg C., which was higher by several degrees than the thermal filling temperature, as shown in FIG. 3(c). The intermediate 6 was then blow molded in the biaxial orientation, and was thermally fixed, to give the container 4 of a final shape, such as a bottle. As shown in FIG. 4, the double blow molding method of this invention gave the laminated container 4 of a 3-layer structure comprising the PET resin layers.

Although FIG. 4 shows the laminated containers 4 of a cylindrical shape, this invention is not limited to such a shape. It is also possible to produce hollow containers of a square or other shapes.

In molding the laminated container 4 of the above 3-layer or 5-layer structure, it is very difficult to form the middle gas barrier layer 4b as a layer as thin and uniform as possible to secure sufficient transparency. It was found that the thinner the middle layer, the more it tended to break.

As the methods of molding laminated containers without such a problem, the afore-mentioned Official gazettes of patent application laid open No. 1985-240409 and patent publication No. 1993-79494 are known to utilize preforms of a 5-layer structure.

EXAMPLE 2

When such a 5-layer preform as used in the above inventions is utilized in this invention to mold a laminated container in a manner similar to Example 1, it is necessary to operate jointly both of the first injection molding machine A for injecting the PET resin such as used in Example 1 and the second injection molding machine B for injecting the gas barrier layers. The 5-layer preform is prepared by performing the injection molding in the manner described in the next paragraph.

First of all, the molten PET resin in the first injection-molding machine A was injected into the injection mold, and soon the injecting operation was tentatively stopped. Then, the MXD-6 nylon resin was immediately injected from the second injection-molding machine B, and soon the injecting operation was stopped. The PET resin was again injected from the first injection-molding machine A, and the mold was cooled while the pressure was maintained. A 5-layer preform P' of a given shape was thus obtained, which comprised the inner and outer layers 8a and 8b as well as the center core 8c of PET resin, plus two thin intermediate layers 9a and 9b of MXD-6 nylon, with the layers of the two resins being laminated alternately in the 5-layer structure, as shown in FIG. 5.

At that time, the 5-layer preform P' was molded so as to give somewhat thick MXD-6 nylon layers 9a and 9b. As in Example 1, the mouth/neck portion 3' of the preform P', which was to become the mouth/neck portion of the container, such as a bottle, was heated to a crystallizing temperature so as to crystallize only the mouth/neck portion without causing any thermal deformation. (Usually a hot core is inserted into the mouth/neck portion to increase the heat resistance.) After this mouth/neck portion was treated for whitening, the body portion of the preform P' was heated to a blow moldable temperature, which was close to the thermal crystallization temperature. (At that time, an air stream may be blown, if necessary, to prevent the surface from reaching a temperature of 120 deg C. and to prevent whitening from occurring.)

Figure 3:
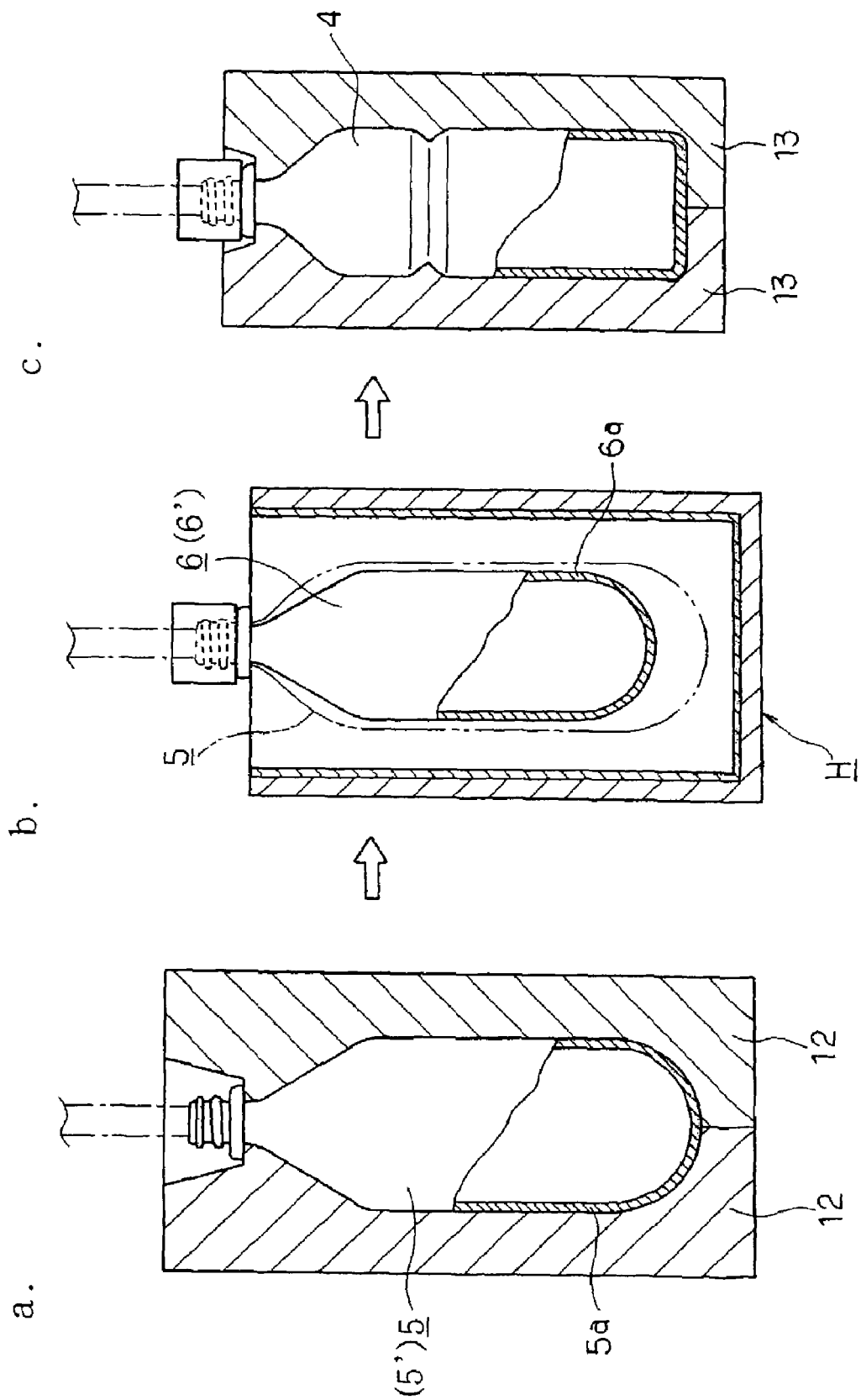
FIG. 3 is a process flow diagram for blow molding a hollow, laminated container of this invention.

As shown in FIG. 3 and following the manner similar to that described in Example 1, the heated preform P' was set in the primary blow mold 12, 12, where the mold trunk had been heated to 160 deg C. and the bottom, to 23 deg C. The blow molding was conducted at a pressure of 26 kg/cm$^2$ for 2.63 sec in the biaxial orientation to produce the primary molded intermediate 5'.

The mouth/neck portion can be treated for whitening by cooling only the mouth/neck portion gradually after it has been fully heated to the crystallization temperature. At the time of this whitening treatment, it is necessary to pay attention not to deform the mouth/neck portion into an inconvenient shape.

Especially if the mouth deformed and lost its circularity, the container would have a greatly reduced function as a molded product. Usually, a jig is inserted into the mouth of the preform to support the preform during blow molding operation and to prevent the mouth/neck portion carefully from deformation.

After the above primary blow mold was opened, the primary intermediate 5' thus obtained was taken out of the mold and heated for 5.5 sec for annealing in the heating zone H provided with a heater utilizing far infrared rays at a temperature in the range of 160-200 deg C., which was higher than the temperature used in the primary blow mold. In this heating step, the primary intermediate is forcibly deformed by thermal shrinkage, and the secondary molded intermediate 6' was obtained.

The secondary intermediate 6' thus formed was kept in the state of secondary heating at 160 deg C., and then was set in the secondary blow mold, where the trunk had been heated to 105 deg C. and the bottom, to 85 deg C., which were higher than the thermal filling temperature. The secondary blow molding operation was conducted in the biaxial orientation at a pressure of 36 kg/cm$^2$ for 2.63 sec to give a container or bottle of the final shape. At the same time, the container was thermally fixed. The laminated container thus obtained from biaxially oriented secondary blow molding was resistant to heat and had a 5-layer structure comprising PET resin layers.

The blow moldability of the 5-layer container was little different from that of the single-layer PET resin container. The container could be molded with comparative ease. Concerning thickness adjustment, the container could have been molded to have the distribution of thickness similar to that of the single-layer PET resin container, but the portion under the mouth/neck portion of the preform was somewhat unstable and apt to elongate, and the bottom tended to get thick. Some containers were found to be unstable in their standing position, and the container trunks were slightly misted.

These disadvantages were caused by the injection of MXD-6 nylon. The more MXD-6 nylon was used, the more transparency was found lost.

EXAMPLE 3

A preform P' was molded in a similar manner as in Example 2, except that MXD-6 nylon resin layers 9a and 9b were given a somewhat lower thickness than in the 5-layer preform of Example 2 shown in FIG. 5.

Following the same method as in Example 2, the preform mouth/neck portion 3', which was to become the mouth of a container, such as a bottle, was treated for whitening to crystallize this portion without causing no thermal deformation. After the preform body portion to be biaxially blown was heated to a blow moldable temperature, which was close to the temperature of thermal crystallization, the preform was set in the primary blow mold, where the trunk portion had been heated to 160 deg C., and the bottom, to 23 deg C. The biaxially oriented blow molding was conducted at a pressure of 26 kg/cm$^2$ for 2.63 sec to give the primary molded intermediate.

It was found that a favorable primary intermediate of a given shape could be obtained by the primary blow molding conducted under conditions of a heating temperature in the range of 70-180 deg C. for the trunk portion and in the range of 20-40 deg C. for the bottom, a blow pressure of 20-30 kg/cm$^2$, and a period of 2.0-7.0 sec.

After the above primary blow mold was opened, the primary intermediate thus obtained was taken out of the mold and was heated for 5.5 sec, in the heating zone H provided with a heater utilizing far infrared rays, to a temperature in the range of 130-200 deg C., which was higher than the temperature used in the primary blow mold. In this heating step, the primary intermediate was forcibly deformed by thermal shrinkage, and the secondary molded intermediate was obtained.

The secondary intermediate thus formed was then set in the secondary blow mold that had been heated to 105 deg C., which was higher than the thermal filling temperature. The secondary blow molding operation was conducted in the biaxial orientation at a pressure of 36 kg/cm$^2$ for 2.63 sec to give a container or bottle of the final shape, and the container was thermally fixed. The laminated container thus obtained from biaxially oriented secondary blow molding was resistant to heat and had a 5-layer structure comprising PET resin layers.

It was found that a favorable molded product could be obtained by the secondary blow molding conducted under conditions of a heating temperature in the range of 80-150 deg C. for the trunk portion and in the range of 75-100 deg C. for the bottom, a blow pressure of 30-40 kg/cm$^2$, and a period of 2.0-7.0 sec.

The blow moldability of the 5-layer container of Example 3 was much closer to that of the single-layer PET resin container than was the 5-layer container of Example 2. The container of Example 3 could be molded more easily than the container of Example 2. Concerning thickness adjustment, the container of Example 3 could be controlled more easily than the container of Example 2, and had the stable distribution of thickness equivalent to that of the single-layer PET resin container.

The container of Example 3 was found more stable in its standing position and had a clearer trunk than in Example 2. On the whole, the container of Example 3 was also on the level similar to the single-layer PET container as far as transparency is concerned.

The laminated containers of Examples 2 and 3 were examined for the phenomenon of peeling between layers. The table below shows the results.

TABLE 1

| Laminated preform | Primary blow | Secondary heating | Secondary blow |
|---|---|---|---|
| Thick MXD-6 (11.5 wt. %) | None | None | None |
| Thin MXD-6 (5.5 wt. %) | None | None | None |

As obvious from the table, no peeling phenomenon was observed between layers among the primary intermediate from the primary blow molding, the secondary intermediate from the secondary heating and thermal shrinkage, and the finished product from the secondary blow molding. When the finished container was pushed with fingers, no peeling occurred between layers at a pressure created with fingers, and its appearance was satisfactory.

The laminated containers obtained from 2-step blow (or double blow) molding conducted in Examples 2 and 3 were examined for permeability to oxygen. Table 2 below shows the results.

TABLE 2

| | Permeability to oxgen | Average thickness | Ratio of permeability |
|---|---|---|---|
| Single-layer PET | 0.021 | 0.39 mm | Set at 1.0 |
| MXD-6 (11.5 wt. %) | 0.002 | 0.40 mm | 0.10 |
| MXD-6 (5.5 wt. %) | 0.007 | 0.39 mm | 0.33 |

It was confirmed from the results of this table that laminated containers had very high oxygen-blocking ability, as compared with single-layer PET resin containers.

Tests for permeability to oxygen were also conducted with a conventional, single blow molded PET container (350 ml) and a single blow molded container (350 ml) laminated with MXD-6 layers, in a similar manner as described above, with a purpose of clearly showing what a remarkable oxygen-blocking property the laminated, double blow molded container of this invention had. The result was as follows:

| | |
|---|---|
| Single-layer PET resin: | 0.031 |
| MXD-6 (5.5 wt. %) | 0.012 |

The ratio of permeability was thus 1.47 for the single-layer PET container and 0.57 for MXD-6 (5.5 wt. %). Concerning permeability to oxygen, the laminated, double blow molded container gave better permeability to non-oxygen gases by 32% than the single blow molded PET resin container and by 41% than the single blow molded container laminated with MXD-6 layers. It was found, therefore, that the double blow molded container had higher gas barrier properties than the single blow molded container even if both containers are laminated similarly.

This is attributable to the fact that, as a result of heat history given to the double blow molded container, the PET resin in this container had a higher temperature of crystallization than in the single blow molded container, thus causing the gas barrier properties to be given also to the PET resin layers of the double blow molded container.

Various hollow containers with a capacity of 500 ml or more were blow molded in the biaxial orientation by the double blow molding method. As in Examples 2 and 3, the PET resin containers laminated with MXD-6 layers were obtained. These containers with a size of 500 ml or more had as high gas barrier properties as had the 350-ml containers.

It was found that favorable containers could be obtained from the biaxially oriented blow molding conducted under the following conditions:

(a) In the primary blow-molding step, the preferred conditions include mold temperatures of 70-180 deg C. for the trunk and 20-40 deg C. for the bottom, a blow pressure of 20-30 kg/cm$^2$, and a blow time of 2.0-7.0 sec.

(b) In the secondary blow-molding step, the preferred conditions include a temperature of 130-200 deg C. for heating the primary intermediate, the mold temperatures of 80-150 deg C. for the trunk and 75-100 deg C. for the bottom, a blow pressure of 30-40 kg/cm$^2$, and a blow time of 2.0-7.0 sec.

The laminated containers prepared in Examples 2 and 3 were tested for heat resistance. All the containers showed no change until a thermal filling temperature of 93 deg C. was reached. At a thermal filling temperature of 95 deg C., the laminated containers showed slightly dropped shoulder, but that was within a practically usable limit.

Therefore, when laminated containers are double blow molded by the method of this invention and are intentionally given heat history, it is found possible to obtain without fail those hollow containers having high gas barrier properties.

Finally, this invention clarified the following points:

The laminated preform of a given shape is molded by injecting the PET resin and a thermoplastic resin having high gas barrier properties, such as the polyamide resin containing meta-xylyl radicals or the ethylene vinyl alcohol copolymer resin, successively into the same mold to obtain a preform of 3-layer or more laminates. At that time, the mouth/neck portion, i.e., the unchanged portion, is made of the PET resin of a single layer structure or the gas barrier resin layer or layers are made to extend and come close to top of the mouth/neck portion, while the body portion of a multilayer structure is expanded and deformed in the biaxial orientation.

After the mouth/neck portion has been crystallized for enhanced strength, the body portion of the above-described preform is heated to a blow moldable temperature in the range of 70-130 deg C., or preferably in the range of 90-120 deg C. The preform is then blow molded as usual in the biaxial orientation in the primary blow mold that has been heated to a temperature in the range of 50-230 deg C., or preferably in the range of 70-180 deg C., to obtain the primary molded intermediate.

After the above primary blow mold is opened, the primary intermediate that has been blow molded in the biaxial orientation is heated in the well-known heating equipment at a temperature in the range of 110-255 deg C., or preferably in the range of 130-200 deg C., which is higher than the temperature used in the primary blow mold. In this heating step, the primary intermediate is forcibly deformed, as it shrinks thermally. The residual stress that has existed inside the primary intermediate disappears in a short time, and the secondary molded intermediate is obtained.

After the heating step, the shrunken secondary intermediate is passed through the step of secondary blow molding in the mold that has been heated to a temperature in the range of 60-170 deg C., or preferably in the range of 80-150 deg C. At that time, the secondary intermediate is blow molded in the biaxial orientation into a bottle or a container of another final shape at a blow ratio smaller than used in the primary blow molding to reduce the residual stress. At the same time, the molded container is thermally fixed in the secondary blow mold kept at a temperature higher than the thermal filling temperature. This thermal fixing treatment gives heat history to the PET resin, thus causing to create a high degree of crystallization. The hollow, laminated PET container acquires quite high resistance to thermal shrinkage and high gas barrier properties because the gas barrier properties can also be expected now from the PET resin layers.

INDUSTRIAL APPLICABILITY

This invention thus makes it possible to secure high gas barrier properties in the laminated polyester resin containers that have been blow molded in the biaxial orientation so as to incorporate a gas barrier layer or layers inside the container wall.

The invention claimed is:

1. A method for molding a laminated polyester resin container, comprising:
   (a) Preparing in advance a multilayer preform by injection-molding said preform in a predetermined shape that corresponds to the shape of a finished molded product, wherein the mouth/neck portion consists of a single layer of the polyester resin and wherein the body portion, including trunk and bottom but excluding said mouth/neck portion, comprises an outer and an inner layer of the polyester resin and at least a medium or intermediate layer of a gas barrier resin;
   (b) heating the body portion of said preform to a blow moldable temperature within the range of 90° to 120° C.;
   (c) setting said heated preform in a primary blow mold that has been heated to a temperature within the range of 70° to 180° C. and blow molding said preform in the biaxial orientation to form a primary molded intermediate;
   (d) heating said primary intermediate to a temperature within the range of 130° to 200° C. to deform it forcibly by thermal shrinkage and thereby to form a secondary molded intermediate; and
   (e) setting the shrunken secondary intermediate in a secondary blow mold that has been heated to a temperature within the range of 80° to 150° C., and subjecting said secondary intermediate to secondary blow molding with biaxial orientation to obtain a finished molded product.

2. The method of claim 1, wherein the mouth/neck portion has been treated for whitening.

3. The method of claim 1, wherein said multilayer preform is obtained by extrusion molding of resins into the multilayer structure of 3 layers of more, including inner and outer layers of polyethylene terephthalate and a middle gas barrier layer of a polyamide resin containing meta-xylyl radicals or an ethylene vinyl alcohol copolymer resin.

4. The method of claim 1, wherein the multilayer preform is obtained by extrusion molding of resins into a 5-layer structure, including inner and outer layers of polyethylene terephthalate as well as a PET center core, plus two intermediate layers of a polyamide resin containing meta-xylyl radicals or the ethylene vinyl alcohol copolymer resin.

5. The method of claim 1 for molding a laminated polyester resin container, wherein the secondary molded intermediate is subjected to the secondary blow molding at a blow ratio smaller than used in the primary blow molding.

6. A method for molding a laminated polyester resin container, comprising:

(a) preparing in advance a multilayer preform by injection-molding said preform in a predetermined shape that corresponds to the shape of a finished molded product, wherein the body portion, including the mouth/neck portion and the trunk and bottom portions, comprises an outer and an inner layer of the polyester resin and at least a medium or intermediate layer of a gas barrier resin;

(b) heating the body portion of said preform to a blow moldable temperature within the range of 90° to 120° C.;

(c) setting said heated preform in a primary blow mold that has been heated to a temperature within the range of 70° to 180° C. and blow molding said preform in the biaxial orientation to form a primary molded intermediate;

(d) heating said primary intermediate to a temperature within the range of 130° to 200° C. to deform it forcibly by thermal shrinkage and thereby to form a secondary molded intermediate; and (e) setting the shrunken secondary intermediate in a secondary blow mold that has been heated to a temperature within the range of 80° to 150° C., and subjecting said secondary intermediate to secondary blow molding with biaxial orientation to obtain a finished molded product.

* * * * *